(No Model.)
O. S. HECKLE.
ROTARY FAN.
No. 415,458. Patented Nov. 19, 1889.
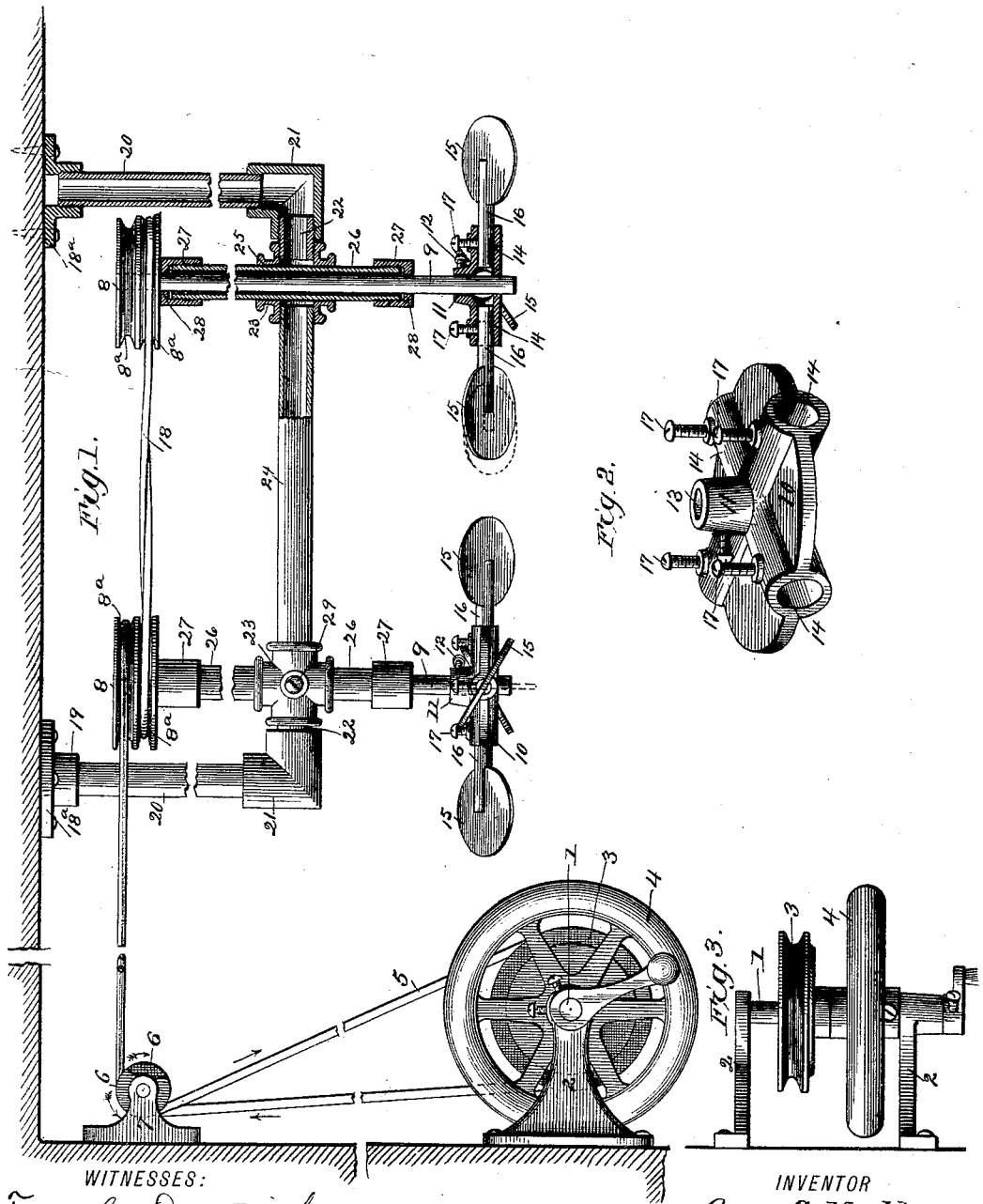
WITNESSES:
Fred G. Dieterich
Jos. A. Ryan
INVENTOR
Oscar S. Heckle.
BY Munn & Co
ATTORNEY

UNITED STATES PATENT OFFICE.

OSCAR S. HECKLE, OF MACON, GEORGIA.

ROTARY FAN.

SPECIFICATION forming part of Letters Patent No. 415,458, dated November 19, 1889.

Application filed June 1, 1889. Serial No. 312,934. (No model.)

*To all whom it may concern:*

Be it known that I, OSCAR S. HECKLE, of Macon, in the county of Bibb and State of Georgia, have invented a new and useful Improvement in Rotary Fans, of which the following is a specification.

My invention consists in certain new and useful improvements in rotary fans, which will be hereinafter fully described and claimed.

Referring to the accompanying drawings, Figure 1 is a side elevation, partly in section, of my invention. Fig. 2 is a perspective view of one of the disks 10, and Fig. 3 is a top plan view of the shaft 1 and wheels 3 and 4.

The same numerals of reference indicate corresponding parts in all the figures.

Referring to the several parts by their designating-numerals, 1 indicates a shaft, which is mounted in bearings 2, and upon which is secured a large grooved wheel 3 and preferably a fly-wheel 4. A belt 5 passes around the grooved wheel 3, up and over two small grooved pulleys 6 6, which are journaled in a bearing 7, and then around the upper groove of a larger pulley 8, having a long flange on bottom to prevent the belt from dropping off, which is rigidly secured upon the upper end of the drive-shaft 9 of the first fan, and which is formed with two annular grooves $8^a\ 8^a$.

Two drive-shafts 9, with their fans, are shown in the accompanying drawings, and the manner in which they are supported from the ceiling will be hereinafter set forth. Upon the lower end of each fan drive-shaft is adjustably secured, by means of a set-screw 12 passing through its collar 11, a disk 10. This horizontal disk is in one piece—an unbroken disk—and has a vertical central collar 11 and a vertical central aperture 13, through which the drive-shaft 9 passes. Each disk 10 is formed with radial chambers 14, the number of which may of course be varied; but the disks will be usually formed with four of the said chambers at right angles to each other.

15 indicates the fans, having round handles 16, which fit in the chambers 14 of the disks and are adjustably held therein by set-screws 17. A second band 18 passes around the grooved pulleys at the upper end of the fan drive-shafts 9, and it will be seen that when the drive-shaft 1 is revolved, either by a crank-handle at one of its ends or by belting from any suitable source of power passing around a drive-wheel, which can be keyed on the end of the drive-shaft, or in any other manner, the fan-shafts 9, no matter how many are employed, will be rapidly revolved, carrying with them the disks 10 at their lower ends and the fans held in said disks.

It will be seen that the disks can be adjusted up and down on the shafts 9, so as to raise or lower to adjust the fans at any desired height, while the fans themselves have two distinct adjustments—that is to say, by loosening their set-screws 17 they can be turned, owing to their handles being round in cross-section, so as to stand at any desired angle, as illustrated in dotted lines in Fig. 1, while they can also be moved in or out from the disk, as also illustrated in dotted lines in the same figure.

The revolving fan-shafts are supported from the wall or other point in the following manner: To the ceiling are secured by screws or bolts disks $18^a$, having central internally-threaded projections 19, in which are screwed the upper threaded ends of tubes or rods 20, the lower threaded ends of which are screwed in elbow-joints 21. In the other ends of these joints 21 are screwed short rods or tubes 22, upon which are screw-threaded castings 23 of substantially the form shown, these castings being connected and braced by a horizontal tube or rod 24, having threaded ends. The vertical openings 25 through the castings 23 form sleeves, through which pass cylinders 26, having caps 27 screwed on both their ends, and the central openings 28 in the ends of these caps form bearings for the fan-shafts 9. The fan-shafts pass through the cylinders 26 and their apertured end caps, the pulleys 8 on their upper ends holding them in position, and it will be seen that as the revolving-fan drive-shafts only come in contact with the bearings in the end-caps of their supporting-cylinders the friction is thus reduced to the minimum.

The cylinders 26 are adjustably held in place in the castings 23 by set-screws 29, and it will be seen that the cylinders, carrying with them the entire fan-shafts and fans, can be adjusted, raised, or lowered, as desired, and secured in their adjusted positions by tightening the set-screws 29.

From the foregoing description, taken in connection with the accompanying drawings, the construction, operation, and advantages of my invention will be readily understood.

It will be seen that my new and improved rotary fan is strong and simple in construction and very efficient in its operation. The fans and all the parts are adjustable, and the fan-shafts may be driven in any desired manner. The novel supporting-frame, it will be seen, can be secured to any wall-girders, &c., so that the fans can be used in any position or place desired.

Having thus described my invention, what I claim, and desire to secure by Letters Patent, is—

1. In a rotary fan, the combination, with the revolving shafts carrying the fans at their lower ends, of the supporting-frame having the bearing-castings 23, provided with the set-screws 29, and the adjustable supporting-cylinders 26, passing adjustably through the castings 23 and having the end caps formed with the central apertures, substantially as set forth.

2. In a rotary fan, the combination of the disks $18^a$, having the threaded projections 19, the tubes having the threaded ends, the elbow-joints, the castings 23, having the set-screws, the cylinders having the apertured end caps, and the shafts carrying the fans at their lower ends and having the grooved pulleys at their upper ends, substantially as set forth.

OSCAR S. HECKLE.

Witnesses:
F. HOSS,
W. H. BURDICK.